May 17, 1960 W. F. NEWBOLD ET AL 2,937,369
ELECTRICAL SIGNAL MEASURING APPARATUS
Filed Dec. 29, 1955
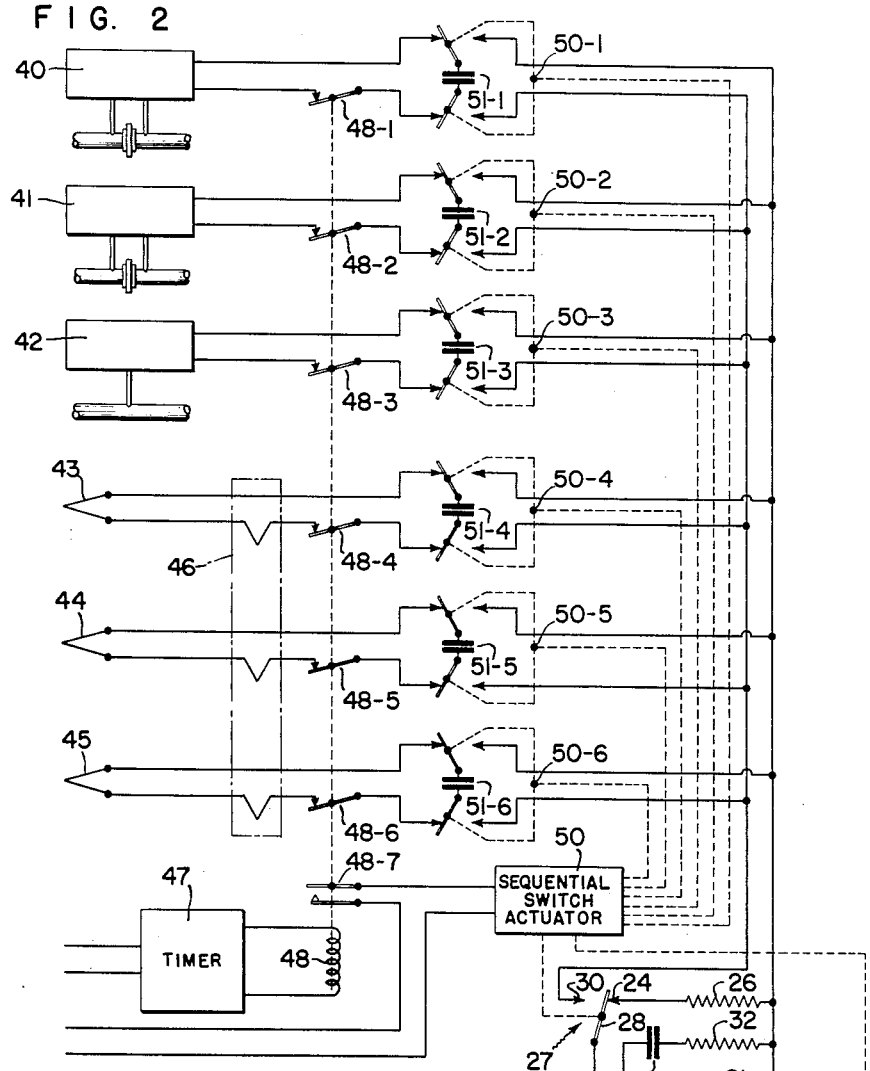
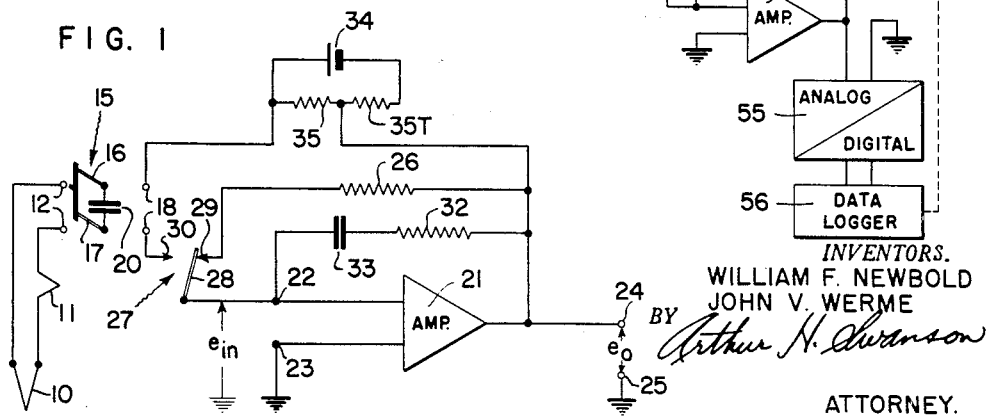
INVENTORS.
WILLIAM F. NEWBOLD
JOHN V. WERME
BY Arthur H. Swanson
ATTORNEY.

United States Patent Office 2,937,369
Patented May 17, 1960

2,937,369

ELECTRICAL SIGNAL MEASURING APPARATUS

William F. Newbold, Ambler, and John V. Werme, Fort Washington, Pa., assignors to Minneapolis-Honeywell Regulator Company, Minneapolis, Minn., a corporation of Delaware Application December 29, 1955, Serial No. 556,318

8 Claims. (Cl. 340—177)

A general object of the present invention is to provide a new and improved signal amplifier apparatus for use in measuring a signal potential on an electric storage element. More specifically, the present invention is directed to an apparatus wherein an electrical signal on a signal storage element may be read without significant disturbance of the signal stored during the interval that the readout takes place.

Certain forms of process data handling systems involve a plurality of variable sensing devices which produce signal potentials proportional to the magnitudes of the variables that are sensed. These variables may well be temperature, flow, pressure, and the like. In such data handling systems, it is conventional to sense the magnitude of the variables and convert the signal potentials into a suitable form wherein the signal potentials may be reduced to a permanent record. This permanent record may well take the form of a typewriter record or other digital form. In some forms of process data handling systems, it is desirable to determine and record the magnitudes of a plurality of variables with the magnitudes being determined at a particular instant of time. An effective way of doing this is to utilize a storage element with each of the individual variable sensing elements and disconnect all of the storage elements from their respective sensing devices at the desired instant. The magnitudes of the stored signals may then be read out in any desired manner into a suitable data logging apparatus.

Numerous problems arise in reading out the signals from storage elements. One of the major problems is the danger of the reading circuits affecting the signal that has been stored on the storage element. In other words, since an analog value is stored on the storage element, there can be no change in that analog value during the reading out operation without the effectiveness of the reading being destroyed. The circuitry of the present invention is directed to a form of storage readout apparatus where the signal potential stored by a storage condenser may be connected into suitable data logging apparatus without materially affecting the signal on the storage element.

It is accordingly a more specific object of the present invention to provide a new and improved apparatus for reading out an analog signal stored upon a signal storage condenser without materially affecting the signals stored on the condenser.

The accurate and non-destructive reading apparatus incorporated in the present invention preferably uses a high gain zero stable amplifier. Such an amplifier is characterized by its ability to hold its output signal to exactly zero potential when there is a zero potential on the input thereto. Such an amplifier generally comprises a pair of amplifiers, one of which is a broad band amplifier and the other is an amplifier having a high degree of zero stability at zero frequency. A representative form of stable amplifier will be found in an article entitled "Stabilization of Wide Band Direct Current Amplifiers for Zero and Gain" by Edwin A. Goldberg in an article published in the RCA Review, June 1950, pages 296 to 300. This type of amplifier lends itself for use in the present circuit arrangement in that it has a high gain characteristic and is zero stable. However, due to the fact that this circuit has a high gain, any switching done in connection with the amplifier input circuit may produce saturation or other undesirable transient conditions which can destroy the effectiveness of the circuit in reading desired signal potentials stored on a storage element. The present invention is further directed to circuitry for minimizing the undesired effects encountered in switching a storage element into a reading position with respect to the amplifier circuit.

It is accordingly a further more specific object of the present invention to provide a new and improved zero stable high gain amplifier having a switching circuit associated therewith with means for locking the amplifier and suppressing transients on the input therefor during the switching operation.

The latter object of the invention may be achieved by providing a transient suppression circuit in the form of an RC network connected between the output and input of the amplifier so as to effectively hold the stable conditions in the amplifier during each switching operation.

Still another more specific object of the present invention is to provide a signal storage element readout circuit of the aforementioned type wherein the circuit is adapted to have a plurality of storage elements connected to a plurality of variables where each of the storage elements are simultaneously disconnected from their variable sensing devices and then sequentially connected to a readout circuit of the aforementioned type.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described a preferred embodiment of the invention.

Of the drawings:

Fig. 1 is a representative form of a single storage element readout circuit incorporating the principles of the present invention; and Fig. 2 shows the present invention applied to a multiple point data logging apparatus.

Referring first to Fig. 1, the numeral 10 represents a variable sensing element, such as a thermocouple, which produces an output potential proportional to the magnitude of the variable being measured. This thermocouple 10 has a cold junction 11 and a pair of output terminals 12 which are adapted to be connected to a double pole double throw switch 15. The switch 15 comprises, in addition to the terminals 12, a pair of switch blades 16 and 17, and a further pair of terminals or contacts 18. Connected between the blades 16 and 17 is a condenser 20.

For reading the potential on the condenser 20, there is provided a zero stable amplifier 21, said amplifier having a pair of input terminals 22 and 23 and a pair of output terminals 24 and 25. Connected between the output terminal 24 and the input terminal 22 is a resistor 26, which corresponds to the feedback resistor $F_f$ of the aforementioned Goldberg amplifier, and this resistor acts as the main feedback resistor in the circuit which is effective to feed the output voltage back to the input so that there will effectively be a zero input voltage across the input terminals 22 and 23. This feedback circuit is completed by way of a switch 27 incorporating a single blade 28 and a pair of contacts 29 and 30. Also connected between the output terminal 24 and the input terminal 22 is a transient suppression circuit comprising a resistor 32 and a condenser 33 connected in series therewith.

Also included in the apparatus of Fig. 1 is a cold junction compensating potential source comprising a battery 34 having a pair of resistors 35 and 35T connected thereacross. The resistor 35T is preferably temperature sensitive. This latter cold junction compensating circuit is desirable in those situations where thermocouples are used and may be used to advantage where a number of thermocouples are to be observed where each of the cold junctions of the thermocouples are maintained at the same temperature.

In considering the operation of the apparatus shown in Fig. 1, the apparatus is first assumed to be in the condition shown upon the drawing wherein the switch 27 is positioned so that the blade 28 is engaging contact 29. This will mean that the feedback resistor 26 is connected between the output terminal 24 of the amplifier 21 and the input terminal 22. As it has been assumed that the amplifier 21 is of the zero stable type, when the amplifier is connected in the aforementioned manner the input voltage across the terminals 22 and 23 will be zero and the output voltage across the terminals 24 and 25 will also be zero. As long as the apparatus remains in the position shown, these zero conditions will exist on the input and the output. When the apparatus is in this condition, it is effectively in a standby position and will produce no useful output for use elsewhere with other control circuitry.

While the amplifier 21 is switched by switch 27 into the standby position, the switch 15 may well be arranged so that it is engaging the contacts or terminals 12 so that the condenser 20 will be charged to a potential equal to the output of the thermocouple 10—11. At a particular instant of time, the switch 15 may be actuated so that the condenser 20 is disconnected from the thermocouple 10 and reconnected to the contacts 18 of the switch 15. When so connected, the condenser 20 will not change its charge since it will be effectively open circuited. With a high quality condenser at 20, this charge on the condenser will hold for a long period of time. It will be noted that the potential on the condenser will be the analog value of the temperature of thermocouple 10 and since it is an analog value, it is essential that the charge not drift or leak off.

When it is desired to read out the signal on the condenser 20 to the output terminals 24 and 25, the switch 27 will be actuated from the position shown upon the drawing to the position wherein the blade 28 engages the contact 30. This will remove the resistor 26 from the feedback circuit and couple the condenser 20 in its place with the compensating circuit in series therewith. As the amplifier is arranged to maintain a zero potential on its input terminals 22 and 23, the only way for this zero potential to be achieved is for the output voltage to increase to a value corresponding to the value of the potential on the condenser 20. The polarity of the potential on the output terminals 24 and 25 must, of necessity, be opposite the polarity of the potential upon the condenser 20. The circuit for this may be traced from the grounded terminal 25 through terminal 24, resistor 35, contact 18, blade 16, condenser 20, blade 17, the other contact 18, contact 30, blade 28, to the input terminal 22. If the potential on the output terminals 24 and 25 is equal and opposite the potential on the condenser 20, the potential of the input terminal 22 will be the same as that of input terminal 23. This feedback voltage on the output terminal 24 and the input terminal 22 will be influenced to the extent that the resistor 35T responds to cold junction temperature. This latter voltage, however, would only serve to vary the relationship between the output voltage on the terminals 24 and 25 with respect to the total voltage appearing across the condenser 20. In other words, it merely adds in a voltage in the feedback circuit to eliminate the effects of the cold junction potential of the thermocouple.

Since the amplifier 21 is a very high gain amplifier and since the condenser 20 is effectively coupled between the output and the input where it sees a very high impedance, the condenser 20 will not be appreciably discharged over that period of time which is necessary in order to take an output signal and feed it through appropriate data reduction apparatus for recording. This high impedance is of a magnitude comparable to the input impedance of the amplifier multiplied by the gain of the amplifier.

After the signal potential on the output terminals 24 and 25 has been read out by appropriate data reduction apparatus, the apparatus may be switched back to the standby position at which time the switch 27 is moved so that the blade 28 engages contact 29. This disconnects the condenser 20 from the circuit and the condenser may now be reconnected to the terminals 12 so that it may be charged in accordance with the output potential of the thermocouple 10—11. It will be noted that with this form of circuitry, it is possible to isolate the thermocouple 10—11 completely from the amplifier 21. This eliminates any interference that might result from any grounding in the thermocouple circuit.

Inasmuch as the potential on the condenser 20 is an analog value of the temperature of the thermocouple 10—11, it is essential that the charge therein not be changed during this switching operation. This is accomplished by arranging the switch 27 so that when the blade 28 moves between the contact 29 and contact 30, there is an open circuiting of the feedback circuit on the amplifier 21. This will insure that the condenser 20 cannot discharge in any circuit, such as through the resistor 26, when the switching operation takes place.

Since the switch 27 is of the non-overlapping contact type, the feedback circuit of the amplifier 21 will be momentarily open when the resistor 26 is taken out of the circuit. Since the amplifier 21 is a high gain amplifier, there is a tendency for this amplifier to produce a transient signal on the output and the amplifier may even go into a saturated condition which will desensitize the same so that it cannot be used to read an input signal. In order to avoid this undesirable condition, the transient suppression circuit including the resistor 32 and the condenser 33 is connected in the feedback circuit to hold the potential of the input terminal 22 at a fixed value during this switching operation. The condenser 33 will be effectively connected in parallel with the condenser 20 when the readout operation is taking place. This will not produce any undesirable results so long as the condenser 33 is selected to be of a capacity which is relatively small when compared with the capacity of the condenser 20. In other words, the condenser 33 may be readily charged to the potential of condenser 20 without appreciably modifying the analog value stored on the condenser 20.

Referring now to Fig. 2, there is shown the present invention applied to a multiple point data reduction or data logging system wherein a plurality of variables are to be monitored and it is desired to make a permanent record of the magnitudes of these variables at a particular instant of time. In the circuit of Fig. 2, components corresponding to the components of Fig. 1 carry corresponding reference characters.

Added to the apparatus of Fig. 2 are a plurality of input signal transducers 40, 41, 42, 43, 44, and 45. Each of the individual transducers are adapted to look at a preselected variable and produce on its output an electrical signal which is an analog value of the variable which is measured. The transducers 40 and 41 may well take the form of flow transmitters. That is, they are transducers which will sense a differential pressure across an orifice in an associated flow line and produce an output electrical signal which is proportional to the flow in the associated flow line. The transducer 42 may well be a pressure transmitter which is adapted to convert an input pressure in an associated conduit into an electrical signal. This signal is likewise an analog value of the pressure in the associated conduit.

The thermocouples 43, 44, and 45 are also transmitters which are effective to convert an associated temperature signal into an electrical signal which is an analog value of the temperature which is measured. The thermocouples 43–45 have their associated cold junctions positioned on a common mounting point or plate 46 so that it is possible to achieve cold junction compensation by a single means.

Also added to Fig. 2 is a timer 47 which is adapted to control a relay having a coil 48 and a plurality of associated switches 48–1, 48–2, 48–3, 48–4, 48–5, 48–6, and 48–7. When the relay coil 48 is deenergized, the switches 48–1 through 48–6 are normally in the closed position while the switch 48–7 is normally in the open position.

A further element added to the circuit of Fig. 2 is a sequential switch actuator 50 which is arranged to be set in operation upon the operation of the timer relay 48 and which may be a simple stepping switch. This sequential switch actuator is arranged to sequentially operate the switches associated with each of the individual variable transmitters. These switches are identified by the numerals 50–1, 50–2, 50–3, 50–4, 50–5, and 50–6 each of which may be a simple double pole-double throw relay. In addition, the sequential switch actuator 50 is also arranged to control the operation of the readout switch 27 on the input of the amplifier 21.

Associated with each of the individual measured variable transmitters is a condenser type storage device and these storage devices are identified by the numerals 51–1, 51–2, 51–3, 51–4, 51–5, and 51–6.

The output of the amplifier 21 is arranged for connection to a suitable analog to digital converter 55. This analog to digital converter is effective to take the analog signal voltages on the output of the amplifier 21 and convert them into digital form so that the same way may be fed to a suitable data logger 56 which is capable of reducing the digital information on the output of the converter 55 into a suitable digital record which may be tabular, punch card or the like.

The operation of Fig. 2 is first considered when the circuit is in the position in which it is shown upon the drawing. When in this position, the data logging and readout equipment is effectively in the standby position. When the apparatus is in the standby position, the switches 50–1 through 50–6 will be so positioned that the respective storage condensers 51–1 through 51–6 are directly connected to the output of the respective measured variable transmitters 40–45 by way of the respective switches 48–1 through 48–6. The signal storage condensers when so connected will be effective to follow the output of the respective transmitter so that at any particular instant the potential across the condenser will be representative of the analog value of the measured variable associated therewith.

After a preselected interval, such as determined by the operation of the timer 47, the relay coil 48 will become energized and will be effective to operate upon the switches 48–1 through 48–6 to open the same. Further, the relay coil 48 will be effective to close the switch 48–7. As soon as the switches 48–1 through 48–6 are opened, the charging circuits for the storage condensers 51–1 through 51–6 will be opened and the condensers will effectively be floating without any discharge path. As long as high quality condensers are used, where these condensers have a negligible leakage resistance, the charge stored upon the condensers 51–1 through 51–6 will remain fixed at the value to which they were charged at the instant that the relay coil 48 became energized.

With a closing of the switch 48–7, the sequential switch actuator 50 is brought into operation and this actuator is in turn arranged to sequentially switch, in order, the individual condensers 51–1 through 51–6 to the input of the amplifier 21. When the switch 50–1 is actuated, the condenser 51–1 will be connected so as to be in a position to be connected in parallel with the feedback stabilizing circuit 32–33. It will be connected directly in parallel therewith as soon as the switch 27 is actuated by the sequential switch actuator 50. When the selected condenser is connected between the output and input terminals of the amplifier 21, the output signal from the amplifier 21 will be of a corresponding magnitude of opposite polarity. This signal is then coupled directly into the analog to digital converter 55 which in turn sets up the circuitry essential for reducing the data into tubular form by the data logger 56. As soon as the digital converter 55 is set up, the sequential switch actuator will be effective to feed a control signal into the data logger so as to initiate the final tabulating operation.

The sequential switch actuator 50 will be effective to switch each of the condensers 51–1 through 51–6 in order to the input of the amplifier 21. These signals will in turn be read out by the amplifier and then fed to the data logger where the same will be tabulated.

It will be readily apparent that the principles set forth in Fig. 2 may be applied to any number of variables within the economic limits of the particular job to which the apparatus is put.

It will further be apparent that the principles of the present invention may be applied to any form of zero stabilized amplifier and it need not necessarily be a direct current amplifier. It is essential in any such amplifier apparatus that it have a zero drift stability and have a very high input impedance when the storage condenser is connected to the amplifier to be read out.

While, in accordance with the provisions of the statutes, there has been illustrated and described the best forms of the embodiments of the invention known, it will be apparent to those skilled in the art that changes may be made in the forms of the apparatus disclosed without departing from the spirit of the invention as set forth in the appended claims, and that in some cases certain features of the invention may be used to advantage without a corresponding use of other features.

Having now described the invention, what is claimed as new and for which it is desired to secure by Letters Patent is:

1. Apparatus for amplifying a potential on a signal storage element comprising a zero stable amplifier having an input and an output, a feedback resistor connected between said output and said input to maintain said output and input at substantially zero potential with substantially zero input signal applied to said amplifier, and switch means connected to the input of said amplifier, said switch means when actuated disconnecting said resistor in said feedback circuit and connecting said signal storage element in said feedback circuit in consequence of which the output of said amplifier is made to be proportional to the signal on said storage element.

2. Apparatus for amplifying a potential on a signal storage element comprising a zero stable direct current amplifier having an input and an output, a feedback resistor connected between said output and said input to maintain said output and input at zero potential when there is no input signal into said amplifier, and switch means connected to the input of said amplifier, said switch means comprising a switch blade connected to said input and movable between a first contact when said feedback resistor is connected to said input and a second contact, said second contact being adapted for connection to said storage element so that when said switch blade is engaging said second contact, said storage element is connected in said feedback circuit to control the signal on the said amplifier output.

3. An electrical amplifying apparatus for non-destructively reading a signal potential stored on a condenser comprising a zero stable direct current amplifier, said amplifier having an input, an output, and a stabilizing feedback circuit between said output and input, a first resistor, a second condenser connected with said resistor to form a series circuit between said output and said input circuit, a second resistor connected in parallel with said series circuit, and switch means connected to said feedback circuit and adapted when actuated to disconnect said second resistor from said series circuit and connect said first named condenser in parallel therewith.

4. An electrical amplifier apparatus for non-destructively reading a signal potential stored on a condenser comprising a signal amplifier having an input and an output, said amplifier comprising a plurality of amplifying devices and a degenerative feedback connection to maintain the input of said amplifier at zero, switch means connected between said input and output, said switch means when actuated connecting said condenser between said output and said input so that the output of said amplifier will be proportional to the signal stored on said condenser, and a potential stabilizing circuit connected between said output and said input so that when said switch means is actuated, the output of said amplifier will remain fixed during the period of switch actuation.

5. Apparatus as defined in claim 4 wherein said potential stabilizing circuit comprises a resistor and a condenser connected in series, said condenser having a capacity less than the capacity of said storage condenser.

6. Electrical apparatus for use in logging a plurality of variables comprising a plurality of condensers, one each for each variable to be logged, means for charging each of said condensers to a value proportional to the magnitude of the respective variable to be logged, a zero stable amplifier having an input and an output, said amplifier having a feedback circuit normally maintaining a zero potential on the input thereof, sequentially actuated switching means connected to each of said condensers and connecting said condensers in sequence to said amplifier between said output and said input so that the potential on the output of said amplifier will be proportional to the potential on the particular condenser connected thereto, circuit means connected to said amplifier to bring the output of said amplifier to zero potential when no condenser is connected thereto, said circuit means comprising a resistor connected between said output and said input and a further switch which, when actuated, disconnects said resistor so that one of said plurality of condensers may be connected to said amplifier, and a signal holding circuit connected between said output and input, said signal holding circuit comprising a resistor and a condenser connected in series.

7. An electrical amplifier apparatus for non-destructively reading a signal potential stored on a condenser comprising a signal amplifier having an input and an output, a first feedback path including a feedback resistor arranged for connection between said output and said input, a second feedback path including said condenser arranged for connection between said output and said input, and switch means selectively operable to connect one or the other of said feedback paths in feedback relation to said amplifier, said switch means being normally closed to connect said first feedback path in feedback relation to maintain the input to said amplifier substantially at zero, said switch means being responsive to control signals to open said first feedback path and to close said second feedback path to apply said stored signal to said amplifier.

8. Apparatus for amplifying a potential on a signal storage element comprising a zero stable amplifier having an input and an output, a feedback resistor connected in a feedback circuit between said output and said input to maintain said output and said input at substantially zero potential with substantially zero input signal applied to said amplifier, and switch means connected to the input of said amplifier, said switch means being operable between a first position whereat said feedback resistor is connected in said feedback circuit and a second position whereat said storage element is the sole signal determining means connected between said output and said input in consequence of which the output of said amplifier is made to be proportional to the signal on said storage element.

References Cited in the file of this patent

UNITED STATES PATENTS

| | | |
|---|---|---|
| 2,691,728 | Noble et al. | Oct. 12, 1954 |
| 2,741,756 | Stocker | Apr. 10, 1956 |
| 2,757,283 | Ingerson et al. | July 31, 1956 |